United States Patent

Hadzeriga

[15] 3,681,931
[45] Aug. 8, 1972

[54] TREATMENT OF PHOSPHATE ROCK SLIMES BY FREEZING

[72] Inventor: Pablo Hadzeriga, Arvada, Colo.

[73] Assignee: Hazen Research, Inc., Golden, Colo.

[22] Filed: March 11, 1970

[21] Appl. No.: 18,490

[52] U.S. Cl. ...................62/58, 23/165, 252/346, 23/312 P
[51] Int. Cl. .............................................B01d 9/04
[58] Field of Search ..62/58; 252/319, 347, 349, 346, 252/348; 23/165 B, 293 R, 165, 312 P

[56] References Cited

UNITED STATES PATENTS

| | | | |
|---|---|---|---|
| 1,359,911 | 11/1920 | Öman | 62/58 |
| 2,174,873 | 10/1939 | Downes et al. | 62/58 |
| 2,922,761 | 1/1960 | Davenport | 252/349 |
| 3,019,611 | 2/1962 | Toulmin | 62/58 |
| 3,248,890 | 5/1966 | Öman | 62/58 |

OTHER PUBLICATIONS

Burton, The Phys. Properties of Colloidal Solutions, 3rd Ed., 1938, pp. 216–219.

*Primary Examiner*—Norman Yudkoff
*Assistant Examiner*—R. T. Foster
*Attorney*—Harris, Kern, Walker and Tinsley

[57] ABSTRACT

This process is a method of treating an aqueous inorganic colloidal suspension to make it amenable to separation by decantation, filtration, and centrifugation and comprises statically freezing the suspension and thawing the thus frozen suspension prior to separation by decantation, filtration, and centrifugation. In the preferred embodiment of the process, the suspension is kept in a frozen state for a predetermined length of time after the static freezing. This process is particularly adept at making phosphate rock slimes amenable to separation by the above-named methods.

14 Claims, 2 Drawing Figures

INVENTOR
PABLO HADZERIGA
BY HIS ATTORNEYS
HARRIS, KIECH, RUSSELL & KERN

TREATMENT OF PHOSPHATE ROCK SLIMES BY FREEZING

BACKGROUND OF THE INVENTION

1. Field of the Invention

This invention is directed to the field of art relating to methods of separating colloidal suspensions; more particularly, to freeze-melt processes for the treatment of aqueous inorganic colloidal suspensions to make them amenable to separation by decantation, filtration and centrifugation.

2. Description of Prior Art

The prior art methods of separating colloidal suspensions are difficult, time-consuming, often expensive, frequently unsuccessful and nonuniversal, and often require expensive equipment, and/or a large area of flat land for settling ponds. The prior art methods include settling, electrolytic salting with polar salts, such as alum, pH alteration with acid or base, filtration, centrifugation, cooling, freezing, and heating. The separation methods of settling, electrolytic salting and pH alteration require holding or settling tanks or ponds which are either relatively expensive or require relatively large areas of valuable flat land. Electrolytic salting and pH alteration add unwanted contaminants to the suspension. Settling, filtration, cooling and heating are frequently unsuccessful or require inordinate periods of time.

In the sewage treatment art, freezing processes for the thickening of sewage sludge have been patented (see U.S. Pat. No. 2,174,873 to J. R. Downes et al. and U.S. Pat. No. 2,703,782 to C. J. Regan et al.). Sewage sludge is an aqueous organic colloidal suspension containing relatively large volumes of bacteria which are continually metabolizing the sewage sludge to liberate heat, and metabolites such as ammonia, amines, carboxylic acids, acetaldehyde, ethanol, $CO_2$, $H_2S$, methane, water and the like. This liberation of heat and chemicals keeps the sludge in a sufficient state of agitation to prevent settling. The sludge cannot effectively be filtered because the bacterial cells which are gelatinous readily clog and seal the pores of the filter media. However, upon freezing sewage sludge, the majority of the bacterial cells are lysed or ruptured and the metabolic processes of the surviving bacterial cells are effectively stopped. When the sludge is thawed, it is in a nonagitated state and it settles at a relatively fast rate. Furthermore, the sludge can be filtered without rapidly clogging the filter medium because of the great reduction in bacterial cells. If, after thawing, the sewage sludge is allowed to attain room temperature over a 24-hour period or longer, the sludge again enters an agitated state and will not settle and will not filter because of the metabolism of the new bacterial cells resulting from normal cell division, of the surviving bacterial cells.

BRIEF SUMMARY OF INVENTION

The present method renders aqueous inorganic suspensions which are not normally separable by settlement and decantation, filtration or centrifugation amenable to such separation techniques. The present method comprises statically freezing a substantial portion of the liquid in the suspension and then thawing the frozen suspension. This method causes the separation of a substantial portion of the water and suspended material, during the static freezing step. Upon thawing, the water and suspended material remain separated, thus permitting the removal of the water from the remaining suspension by decantation or other known methods. The method also makes the suspension readily susceptible to separation by filtration or centrifugation.

An object of this invention is to provide a relatively rapid method of separating aqueous suspensions without the addition of salts, acids or bases. In particular, it is an object to provide a method of treating phosphate rock slimes in order to make them amenable to dewatering by decantation.

A further object of the present invention is to provide a method of treating aqueous inorganic suspensions that are not normally susceptible to filtration or centrifugation amenable to separation by such methods.

DETAILED DESCRIPTION

Figure 2:
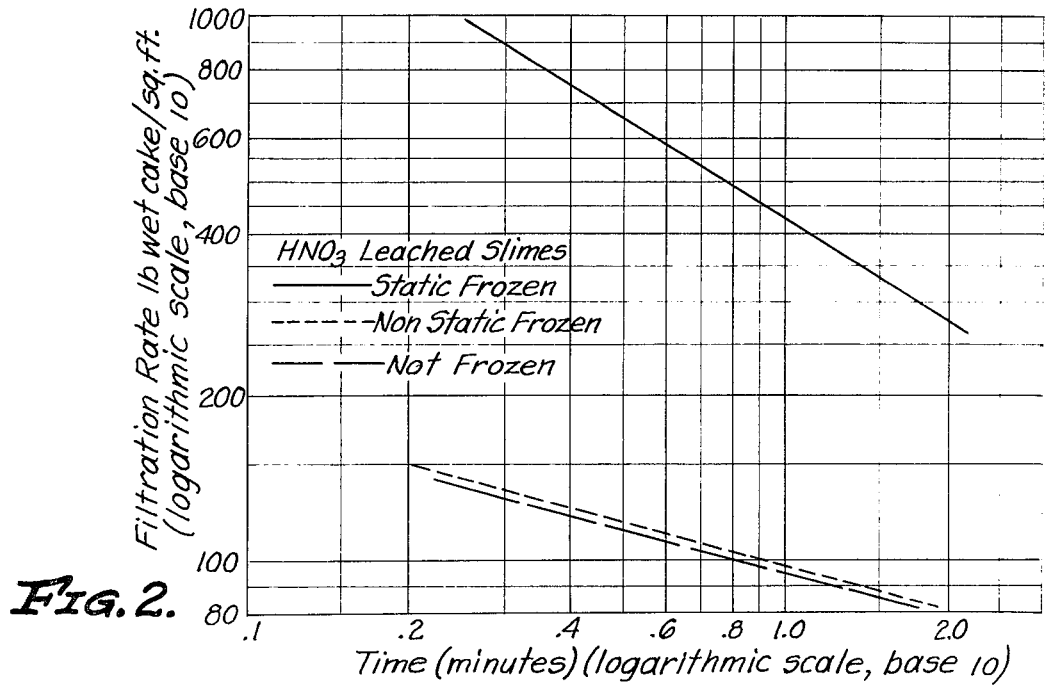
FIG. 2 is a graph (logarithmic scale) illustrating the change in filtration rate of variously treated $HNO_3$ leached phosphate slimes with respect to time.

The present invention comprises statically freezing a substantial portion of the liquid in an aqueous inorganic suspension and then thawing the frozen suspension. Static freezing consists of subjecting the suspension to a freezing temperature in a quiescent, nonagitated state during the freezing step. The advantages of the present process are nullified if the suspension is agitated during the freezing, i.e., if the suspension is agitated upon freezing, little, if any, separation of the water and suspended material will occur and the thawed suspension will filter no more rapidly than an untreated or unfrozen suspension (FIG. 2). The suspension is frozen to at least the freezing temperature of the liquid in the suspension; however, improved separation results are obtained when the suspension is frozen to even lower temperatures. The suspension can be frozen down to any freezing temperature; however, the actual freezing temperature employed will be governed by economic factors and the available equipment. For purposes of the present invention, a practical temperature for the freezing step has been found to be a temperature between about $-1°$ C. and about $-100°$ C., preferably between about $-20°$ and $-80°$ C.

The thawing step is generally conducted at ambient or room temperature, although it can be conducted at any temperature above the freezing temperature of the suspension. In the preferred embodiment of the invention, the thawing is conducted as a static thawing, that is, the frozen suspension is allowed to melt in a quiescent state without agitation.

In the preferred mode of the present invention, the frozen suspension is allowed to remain in a frozen state for a predetermined length of time after the static freezing step. The frozen suspension is generally kept in the frozen state for at least about one hour, preferably for about 24 hours.

After the frozen suspension has statically thawed, there remains a two-phase or layer mixture. The top layer, which often represents between about 10 percent and about 60 percent of the original volume of the suspension, is generally a clear or slightly turbid liquid which contains dissolved material and which is substantially free of suspended matter. The bottom layer contains the remaining liquid and solid matter of the original suspension. After the frozen suspension has thawed, the top liquid layer or decant is removed by decantation or by another known method from the thawed suspension, and the remaining bottom layer or concentrated suspension is filtered or centrifuged to further dewater the solids contained therein. Optionally, the thawed suspension can be directly filtered or centrifuged without removing the top liquid phase.

The present method is effective in the treatment of a large number of aqueous inorganic colloidal suspensions that are not normally amenable to separation, such as suspensions of colloidal metal hydroxides (see FIG. 1), colloidal suspensions of titanium oxide, colloidal suspensions of silicon dioxide, colloidal suspensions of clays like montmorillonite, illite, Fuller's earth and limonitic laterite, and phosphate rock slimes.

The present method is particularly adept for the treatment of phosphate rock slimes, unleached or acid-leached, which are the waste tailings from the beneficiation process of phosphate rock ores. In Florida, as well as in Tennessee, this process consists of washing and removing the slime-clay fraction followed by flotation to further upgrade the phosphate rock product. During the desliming, from one-third to one-half of the contained phosphate values are discharged with the slimes. These slimes are removed, not only because they are refractory toward presently known upgrading processes, but they also interfere with the operation of the flotation on the remainder of the material. These slimes represent a tremendous loss of raw material as well as constituting an expensive nuisance since they must be impounded to prevent stream pollution. These slimes are a colloidal water suspension of micron and submicron size clay-sand-phosphate rock containing between 5 and 10 percent total solids which contain between 10 and 18 percent $P_2O_5$. These solids are very difficult to dewater by filtration, settlement or centrifugation. It has been found that several years are required before the solids will settle to a density of 20 percent solids upon standing in the disposal ponds. Since the volume of slimes produced is 1.2–1.5 the volume of phosphate rock mined, constant additional new areas of land are needed to maintain normal mining and production operation, and prevent pollution. The slimes are practically impossible to dewater economically by filtration or other solid-liquid separation techniques.

If a phosphatic slime containing 5 to 10 percent solids is subjected to static freezing and thawing, it may be concentrated to 25–30 percent solids after separation of the clear top layer of water. Further dewatering of the solids to a cake containing 40–45 percent solids can be easily accomplished by filtration. In the case of leaching the slimes with nitric acid to dissolve the $P_2O_5$ values, the filtration rates of the insoluble residue after static freezing and thawing are increased by a factor of 4 to 10 times compared with unfrozen or nonstatically frozen slimes (see FIG. 2).

The cooling and freezing of aqueous suspensions by refrigeration equipment requires a substantial energy expenditure. In order to minimize the energy expenditure, the present process is preferably conducted so that the heat energy of a batch of unfrozen suspension is used to thaw a batch of frozen suspension resulting in the cooling of the unfrozen batch. Additional cooling can be accomplished by passing a batch of thawed suspension through a heat exchanger also being fed the cool decant or filtrate of a batch of thawed suspension.

The following examples are included to further illustrate the practice of this invention and are not intended as limitations of the present invention.

EXAMPLE 1

Phosphate slimes were leached with nitric acid and subjected to different freezing techniques. In one case the leached slimes were introduced into a household freezer at a temperature of −20° C. Another sample was frozen using an agitated refrigerated drum at a temperature of −20° C. Upon thawing, the filtration rates were measured using a 0.019 square foot filter leaf and compared with filtration rates obtained from leached slimes which were not frozen. The results plotted against cake formation time are presented in FIG. 2. It can be seen that the static freezing method gave filtration rates on this comparative basis of about 7 times (for 15 second formation) those obtained by drum freezing. The agitated refrigerated drum freezing did not show any improvement over the filtration rates of slimes which were not frozen.

EXAMPLE 2

Comparative filtration tests were performed using untreated Florida phosphate rock slimes containing 13.1, 12.7, 10.0, and 9.4 percent solids in suspension. Using a filter leaf with an area of 0.1 square foot and vacuum of between 15 and 18 inches of mercury proved to be unsuccessful in obtaining filtration rates on untreated slimes. The filtrate which was obtained was very cloudy and at best the filtered cake was never more than one-sixteenth inch thick regardless of how long the leaf was left in the slurry. The thin slime coating on the filter cloth could not be blown off with air pressure as it had effectively impregnated the filter cloth.

Duplicate samples of the above were frozen in a kerosene bath held at −20° C. After allowing to thaw at room temperature, each sample separated into two layers: a clear top liquid and a bottom slurry. After decanting the clear liquid, the slurry was filtered using the same procedure described above. The measured filtration rate varied from 3,000 to 4,300 pounds of wet cake (containing between 30 and 40 percent solids) per square foot of filtering area per 24 hours.

EXAMPLE 3

Aluminum, magnesium, and ferric hydroxides were prepared by precipitating the hydroxides from aqueous solutions of aluminum chloride, magnesium chloride, and ferric chloride by the addition of ammonia. The concentration of solids in the suspensions were 1.8, 2.6, and 3.6 percent for aluminum hydroxide, magnesium hydroxide, and ferric hydroxide, respectively.

Each of the metal hydroxide suspensions were divided into two fractions. One fraction was frozen to −20° C. and then allowed to melt at ambient temperature over a period of 60 minutes. The unfrozen remaining fraction was allowed to settle for 60 minutes. The clear liquid phase that developed at the top of each fraction after 60 minutes was decanted off and measured and compared with the total colloidal suspension volume. The results are shown in the following table:

| Metal Hydroxide Suspension | Subjected to Freeze-Melt Method | Decant as Percent of Total Colloidal Suspension |
|---|---|---|
| Aluminum hydroxide | No | 8.0 |
| Magnesium hydroxide | No | 4.3 |
| Ferric hydroxide | No | 15.5 |
| Aluminum hydroxide | Yes | 30.6 |
| Magnesium hydroxide | Yes | 50.5 |
| Ferric hydroxide | Yes | 46.2 |

Figure 1:
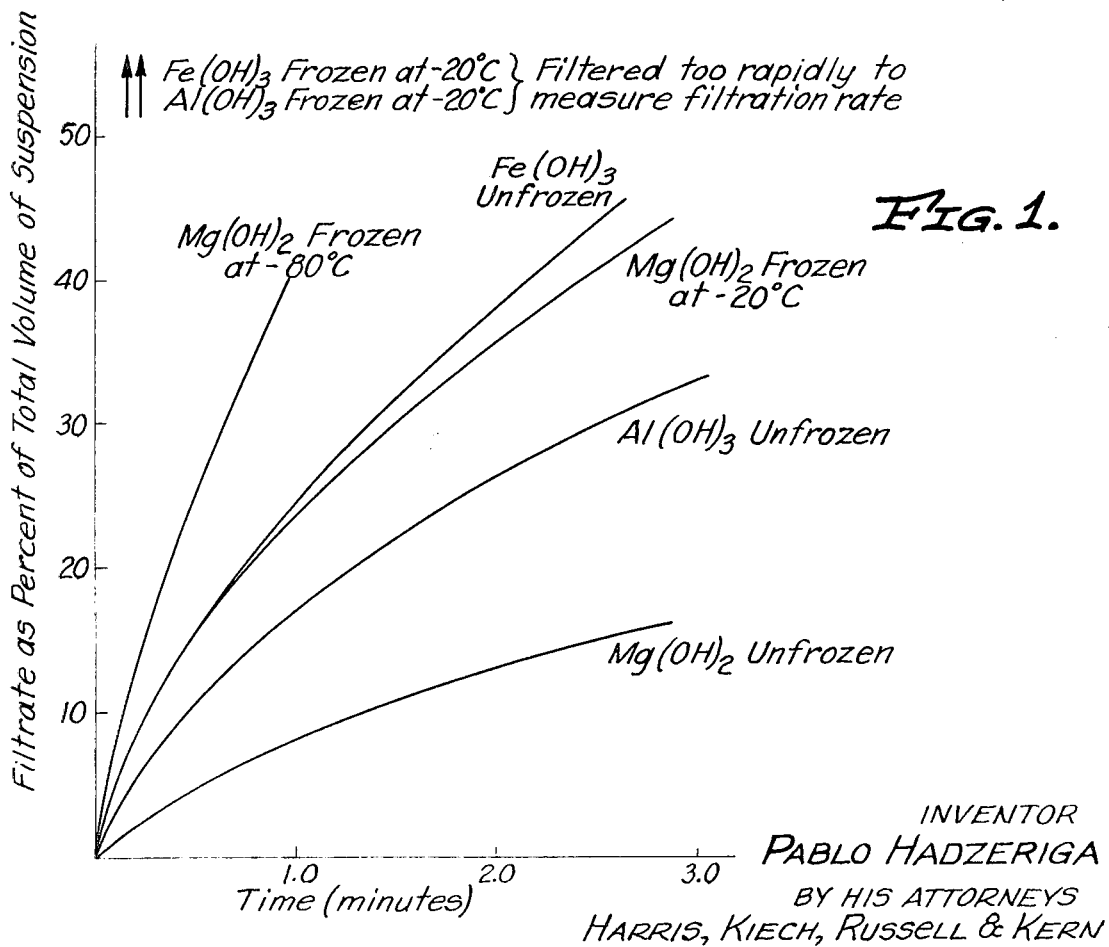
FIG. 1 is a graph illustrating the change in filtration rate of variously treated metal hydroxide suspensions with respect to time.

Further samples of aluminum, magnesium, and ferric hydroxides were prepared as described above and each hydroxide sample was divided into two fractions; one fraction was subjected to the freeze-melt method of the present invention and the other fraction was left untreated. The filtration rates for the metal hydroxide fractions were measured using a Buchner funnel and an Eimco NY319F filter cloth. The results are graphically shown in FIG. 1. The ferric hydroxide and aluminum hydroxide fractions subjected to the freeze-melt method filtered too rapidly to obtain data and are represented by two arrows in the left portion of FIG. 1. FIG. 1 shows that unfrozen colloidal suspensions filter at a much slower rate than one subjected to the freeze-melt method.

Further samples of magnesium hydroxide were prepared as described above and divided into two fractions. Both fractions were frozen in a kerosene bath (−20° C.) for 90 minutes; one fraction was removed and thawed and filtered as described above; the other sample was immersed in a dry ice-acetone bath (−80° C.) for an additional 30 minutes. This latter fraction was then removed from the bath, allowed to melt at ambient temperature, and filtered. The filtration rates of the two fractions are graphically illustrated in FIG. 1 which shows that the employment of a lower freezing temperature in the static freezing step of the freeze-melt method improved the resulting filtration rate of the colloidal suspension.

EXAMPLE 4

An aqueous suspension of 2.5 percent Cab-O-Sil silicon dioxide was prepared. The sample was divided into four fractions; two samples were subjected to the freeze-melt technique of the present invention and the remaining two fractions were untreated. The first untreated fraction was allowed to settle for 60 minutes and the resulting turbid supernatant was decanted therefrom. The second untreated fraction was filtered through a No. 3 Whatman filter. The third treated fraction (i.e., the fraction subjected to the freeze-melt technique) was subject to decantation upon thawing to remove the clear supernatant. The fourth treated fraction was filtered through a No. 3 Whatman filter. The following table presents the results obtained:

| Fraction | Subjected to the freeze-melt | Percent volume of decanted liquid | original suspension volume | Filtration rate |
|---|---|---|---|---|
| First | No | | 18 (cloudy) | — |
| Second | No | | — | 3 minutes |
| Third | Yes | | 80 (clear) | — |
| Fourth | Yes | | — | Thawed suspension filtered as rapidly as it was transferred to the filter funnel |

EXAMPLE 5

An aqueous sample of −200 mesh hydrolyzed titanium dioxide, which had not settled at all upon several weeks of standing, was frozen in a kerosene bath (−20° C.) for a period of 3 hours and then allowed to thaw at ambient temperature. The thawed suspension had two phases; a turbid supernatant, which was decanted and represented 64 percent of the original volume of colloidal suspension, and an opaque concentrated closed suspension phase at the bottom.

EXAMPLE 6

Aqueous suspensions of montmorillonite, illite, Fuller's earth and limonitic laterite clays, which are very difficult to dewater by filtration or settling, were prepared.

After being allowed to settle for 40 minutes, an aqueous suspension of montmorillonite (9 percent solids) produced no clear decant. The suspension was removed from the sands and an attempt was made to filter it on a leaf filter which proved unsuccessful. The suspension was then frozen in a kerosene bath (−20° C.) for one hour. The frozen suspension was then thawed at ambient temperature to produce a clear decant which constituted 83 percent of the original volume of the suspension. The decant was removed and the lower concentrated suspension phase was filtered at a very rapid rate.

An aqueous suspension of illite was allowed to settle for 20 minutes to produce a decant which constituted 32 percent of the original volume of the illite suspension. Another aqueous suspension of illite was prepared and frozen in a kerosene bath (−20° C.) for 1 hour; the frozen suspension was then allowed to thaw in a hot water bath for a 20(P) -minute period. Upon thawing, the suspension produced a clear decant which constituted 55 percent of the original volume of the suspension.

One liter of an aqueous 10 percent suspension of Fuller's earth was prepared and divided into two 500 ml. fractions. One fraction was allowed to settle for 2 hours to produce a cloudy decant of 25 ml. The other fraction was frozen in the kerosene bath (−20° C.) for 2 hours. The frozen suspension was then allowed to thaw to produce a less cloudy decant which constituted 47 percent of the original volume of the suspension.

An aqueous suspension of limonitic laterite was allowed to settle for 16 hours without producing any measurable decant. The suspension was then removed from the settled sands and allowed to further settle for several days without any results. The suspension was then frozen in a kerosene bath (−20° C.) and then allowed to thaw. Upon thawing, 99 percent of the total solids of the suspension were flocculated and settled to the bottom of the container.

EXAMPLE 6

Four samples of 100 ml. each of nitric acid leached phosphate rock slimes were put in the household freezer. At different intervals of time, they were taken out and allowed to melt. Since there is always a clear liquid at the top upon melting, this was carefully decanted and measured. Filtration tests, using the 0.019 square foot leaf were performed under comparable conditions (30 seconds forming time). The following results were obtained:

Time of Freezing of $HNO_3$ Leached Slimes

| Time in freezer (hours) | Temp. of frozen slimes (degrees C.) | Volumes of decanted liquid phase (ml.) | Weight of cake (dry) obtained in 30 seconds forming (grams) |
|---|---|---|---|
| 3.0 | −6 | 25 | 1.60 |
| 5.5 | −18 | 28 | 1.64 |
| 7.5 | −18 | 28 | 1.60 |
| 24.0 | −20 | 35 | 2.03 |

It can be seen that as the time was extended, the frozen slimes approached the working temperature of the freezer (−20° C.). However, it can be noticed that, as this happens, more effective decantation and filtration are obtained. Comparing the tests of 7.5 and 24 hours having a difference of only 2° C., it can be concluded that by substantially increasing the time during static freezing, the filtration rates will be increased. However, the difference in filtration rates between the 3.0 and 7.5 hour tests is negligible.

I claim:

1. A method of making a phosphate rock slime amenable to separation by decantation, filtration and centrifugation which comprises:
   statically freezing a substantial portion of liquid in the phosphate rock slime at a freezing temperature;
   maintaining the phosphate rock slime in a frozen state for a predetermined length of time; and
   thawing the frozen phosphate rock slime without agitation prior to the separation by decantation, filtration, or centrifugation.

2. The method as defined in claim 1 wherein the frozen suspension is statically thawed in the thawing step.

3. The method as defined in claim 1 wherein the freezing temperature is between −1° and −100° C.

4. The process as defined in claim 1 wherein the freezing temperature is between about −20° and −80° C.

5. The method as defined in claim 1 wherein the total solids content of the phosphate rock slime is between about 5 percent and about 10 percent.

6. The method as defined in claim 1 wherein the phosphate rock slime is an acid leached phosphate slime.

7. The method as defined in claim 1 wherein the freezing temperature is about −20° C.

8. The method as defined in claim 7 wherein the phosphate rock slime is kept in a frozen state for at least about 24 hours.

9. A process for the treatment of phosphate rock slimes which comprises:
   subjecting the phosphate rock slimes to a freezing temperature, without agitation of the suspension, for a period sufficient to separate and freeze a substantial portion of the water therein;
   subjecting the phosphate rock slimes to a thawing temperature without agitation for a period sufficient to melt the frozen water therein to yield a bottom layer of phosphate rock slimes concentrated suspension and an upper layer of liquid containing essentially water and dissolved matter; and
   filtering off the upper thawed liquid layer from the thawed concentrated suspension.

10. The process defined in claim 9 including the additional step of keeping the phosphate rock slimes in a frozen state for a predetermined length of time after the freezing step.

11. The process defined in claim 9 including the additional step of decanting the upper layer of liquid from the thawed phosphate rock slimes prior to the filtration step.

12. The process defined in claim 9 including the additional step of centrifuging the thawed phosphate rock slimes to effect further concentration of the concentrated suspension prior to the filtering step.

13. The process defined in claim 9 wherein the phosphate rock slime is an acid leached phosphate rock slime.

14. The process defined in claim 9 wherein the freezing temperature is between about −20° C. and about −80° C.

* * * * *